United States Patent
Jun et al.

(10) Patent No.: US 9,553,722 B2
(45) Date of Patent: Jan. 24, 2017

(54) GENERATING A KEY BASED ON A COMBINATION OF KEYS

(71) Applicant: CRYPTOGRAPHY RESEARCH, INC., San Francisco, CA (US)

(72) Inventors: Benjamin Che-Ming Jun, Burlingame, CA (US); Ambuj Kumar, Sunnyvale, CA (US)

(73) Assignee: CRYPTOGRAPHY RESEARCH, INC., San Francisco, CA (US)

( * ) Notice: Subject to any disclaimer, the term of this patent is extended or adjusted under 35 U.S.C. 154(b) by 0 days.

(21) Appl. No.: 14/792,445

(22) Filed: Jul. 6, 2015

(65) Prior Publication Data

US 2016/0013939 A1    Jan. 14, 2016

Related U.S. Application Data

(60) Provisional application No. 62/022,122, filed on Jul. 8, 2014.

(51) Int. Cl.
*H04L 9/00*    (2006.01)
*H04L 9/08*    (2006.01)

(52) U.S. Cl.
CPC ............ *H04L 9/0866* (2013.01); *H04L 9/003* (2013.01); *H04L 2209/24* (2013.01)

(58) Field of Classification Search
CPC ...... H04L 9/0866; H04L 9/003; H04L 9/0833; H04L 63/065; G06F 21/44; G06F 21/62
See application file for complete search history.

(56) References Cited

U.S. PATENT DOCUMENTS 7,234,058 B1 *  6/2007  Baugher ............... H04L 9/0833
                                                                     380/259

* cited by examiner

*Primary Examiner* — Minh Dinh
(74) *Attorney, Agent, or Firm* — Lowenstein Sandler LLP

(57) ABSTRACT

A first key associated with a plurality of devices may be received. Furthermore, a second key associated with a single device may be received. The first key associated with the plurality of devices may be modified based on a device identification of the single device. Additionally, a primary key may be generated based on the modified first key and the second key.

20 Claims, 11 Drawing Sheets

GENERATING A KEY BASED ON A COMBINATION OF KEYS

RELATED APPLICATION

This application claims the benefit under 35 U.S.C. §119(e) of U.S. Provisional Application 62/022,122 filed on Jul. 8, 2014, which is hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
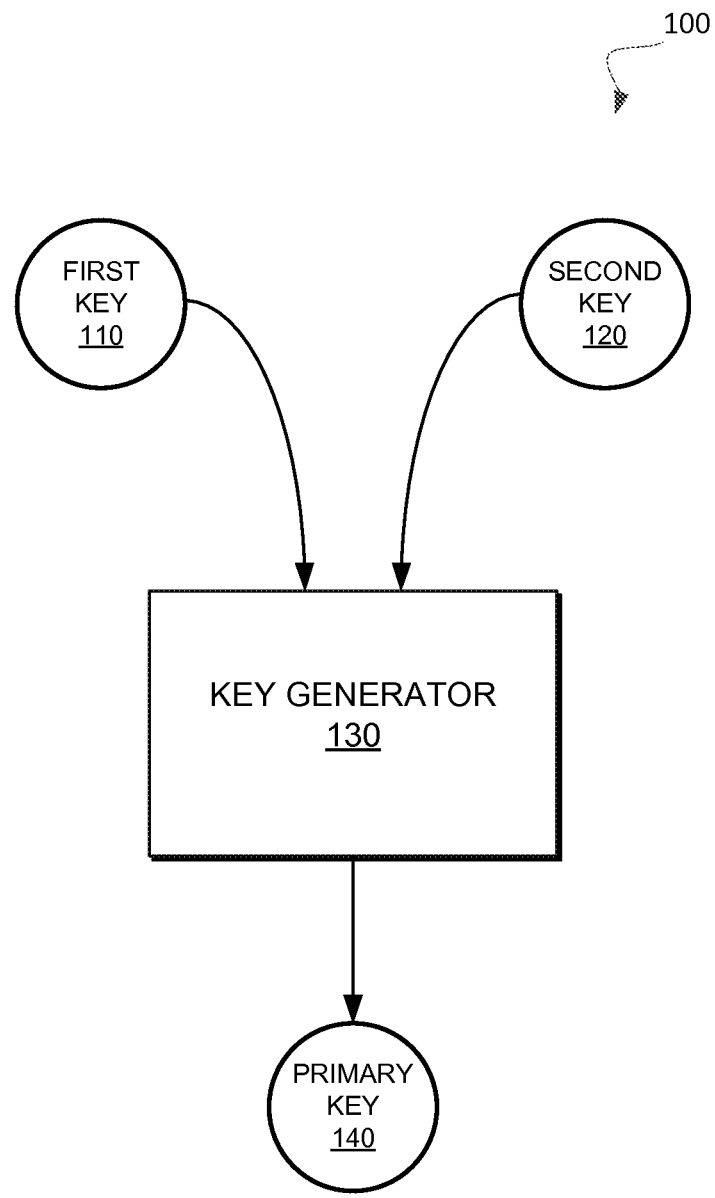
FIG. 1 illustrates an example environment to generate a primary key based on a combination of a first and a second key in accordance with some embodiments.

Described herein is the generation of a key based on a combination of keys. In some embodiments, a key (i.e., a primary key) may be generated based on a combination of a first key and a second key. For example, a primary key may be generated based on the first key (also referred to as a first key split) and the second key (also referred to as a second key split). The first key may be associated with multiple devices (e.g., a processor, a field programmable gate array, a system on a chip, or any other integrated circuit or an electronic product that incorporates an integrated circuit) and the second key may be associated with a specific device (e.g., a single processor, a single field programmable gate array, a single system on a chip, or one other integrated circuit or one electronic product that incorporates an integrated circuit). For example, the first key may be a key or key split that is provided or assigned to multiple devices. Such a key, common to multitude of devices, is referred as the common key. Furthermore, the second key may be a key or key split that is device dependent or device unique such that each device is provided or assigned a different second key. Such a key may be referred to as a device key.

Each device may include the common key and one or more device keys. In some embodiments, each device may include multiple device keys and a single common key that is identical to a common key of other devices. A primary key may be generated based on a combination of the common key and one of the device keys. For example, the primary key may be generated based on an encryption of the combination of the two separate keys. The primary key may be used to authenticate or authorize operations to be performed by a device. In some embodiments, the primary key may be used by a portion of an integrated circuit to perform an operation or access a particular memory. For example, a first portion (e.g., a key generator as described in further detail below) of an integrated circuit may generate the primary key and a second portion of the integrated circuit may receive the primary key and use the primary key in order to authenticate or authorize an operation or memory access by the second portion of the integrated circuit. In some embodiments, the common key and the device keys may be stored in a one time programmable (OTP) memory of a device (e.g., a portion of an integrated circuit or another integrated circuit incorporated into an electronic product that uses one or more integrated circuits). The common key may be programmed into the OTP memory at a first time (e.g., when the OTP memory is first manufactured) and at a first location (e.g., at a first manufacturing site that manufactures the OTP memory) and the device keys may be programmed into the OTP memory at a second time (e.g., when the OTP memory is integrated into an electronic product that uses one or more integrated circuits) and at a second location (e.g., at a second manufacturing site that assembles the electronic product). Thus, since the programming of the common key into the OTP memory and the device keys into the OTP memory may be performed at different times in different locations (i.e., different manufacturing sites), the required use of both the common key and one of the device keys to generate a primary key may provide a level of security with regard to the primary key. For example, if the common key were leaked or compromised by an unauthorized entity (e.g., an employee involved in the manufacturing of the OTP memory or the programming of the common key into the OTP memory) at the first location (i.e., a first manufacturing location), the primary key would not be known or obtained by the unauthorized entity as the unauthorized entity may not have accessed or compromised the device keys as the device keys may be programmed into the OTP memory at a different location from the first location associated with the unauthorized entity. Thus, the use of the common key and the device keys may provide a greater level of security with regard to the primary key that may be generated based on a combination of the common key and one of the device keys.

In some embodiments that may be constrained by cost or logistics issue, the common key and the device specific key may be programmed by the same entity, or at the same location, or at the same time.

Furthermore, in some embodiments, the common key may be modified or diversified based on a device identification and/or a selection of one of the device keys. For example, as previously described, the OTP memory of a device may be associated with multiple device keys. One of the device keys in the OTP memory of the device may be selected based on a device key selection signal or input. In some embodiments, the device key selection signal or input may be received from another portion of an integrated circuit. For example, an electronic product may incorporate an integrated circuit that includes an OTP memory and a control logic portion of the integrated circuit may transmit a device key selection signal. The use of the device key selection signal may allow the programming or retrieving of individual device keys into the OTP memory at specific locations in the OTP memory. For example, the OTP memory may include eight memory locations to store eight device keys and each of the eight memory locations may be identified by the device key selection signal to either retrieve the device key or store a device key at the OTP memory location identified by the device key selection signal. Thus, the device key selection signal or input may specify a particular device key of the multiple device keys that may be selected or retrieved from the OTP memory of the device. Furthermore, the device key selection signal or input may be used in a process to diversify or modify the common key of the device. Such diversification or modification of the common key may provide additional protection from possible compromise by an unauthorized entity of the common key that is used in the process to generate the primary key. For example, the diversification or modification of the common key may protect the use of the common key in the generation of the primary key from side channel attacks (e.g., an attack based on information gained from the physical implementation of a cryptographic system such as the circuitry of the device that is used to generate the primary key). Examples of side channel attacks are, but not limited to, differential power analysis (DPA), simple power analysis (SPA), timing analysis, etc. The diversification or modification of the common key may be performed by a key tree, which is described in further detail below, may perform a diversification or modification operation on the common key. The internal operations of the key tree may be implemented so that if an unauthorized entity performs a DPA analysis on the key tree, the information obtained by the DPA analysis may be infeasible to derive the output of the key tree. Thus, the use of a key tree may be used to improve the protection of the primary key from such side channel attacks. In some embodiments, the common key may also be modified or diversified based on a device identification.

Thus, the generation of the primary key based on two keys or key splits (e.g., the common key and one of the device keys) and the diversification or modification of the common key based on a device identification and/or a selection of one of the device keys may result in improved security for the process that is used to generate the primary key.

FIG. 1 illustrates an example environment 100 to generate a primary key based on a combination of a first key and a second key. In general, the example environment 100 illustrates the use of a first key (e.g., a common key) and a second key (e.g., a device key) that may be used to generate or create a new key (e.g., a primary key).

As shown in FIG. 1, the example environment 100 illustrates a first key 110 that may represent a common key for a device and a second key 120 that may represent one or more device keys for a device. In some embodiments, a key generator 130 may be associated with a device. The key generator 130 may be implemented in an integrated circuit. In some embodiments, the key generator 130 may be a portion of a device that may receive the first key 110 and a second key 120 to generate a third key (e.g., the primary key 140). In some embodiments, the common key corresponding to the first key 110 may be modified or diversified based on a device identification and/or a selection of the second key 120 that corresponds to one of multiple device keys. The modified or diversified first key 110 or common key may be used in conjunction with the second key 120 or the device key to generate the primary key 140. Further details with regard to the architecture of the key generator 130 of a device and the modification or diversification of the common key are described in further detail below with regard to FIGS. 2-11.

Figure 2:
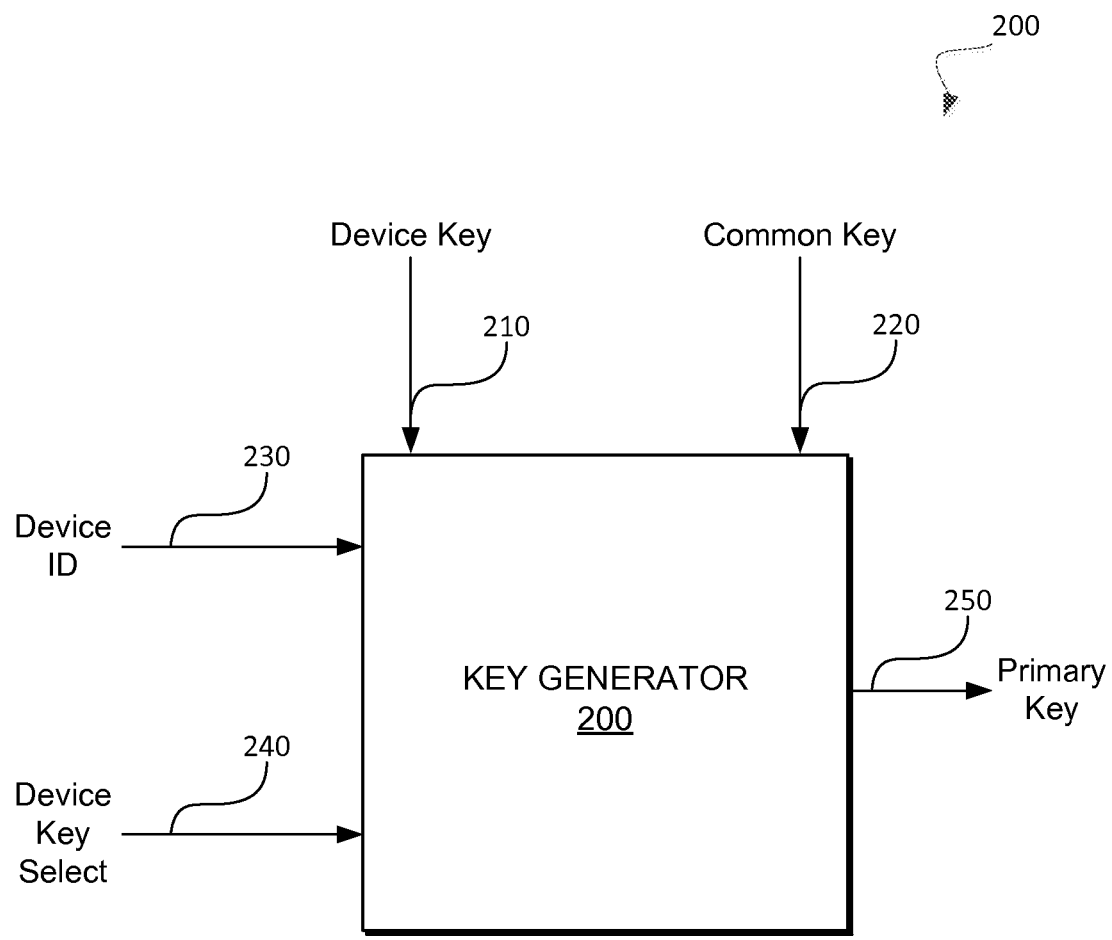
FIG. 2 is a block diagram of an example key generator in accordance with some embodiments of the present disclosure.

FIG. 2 is a block diagram of an example key generator 200. In general, the key generator 200 may correspond to the key generator 130 of FIG. 1. The key generator 200 may be used in a device to generate a primary key based on a combination of a common key and a device key.

As shown in FIG. 2, the key generator 200 may receive a device key 210 and a common key 220. In some embodiments, the device key 210 and the common key 220 may be received from an OTP memory of a device. In the same or alternative embodiments, the OTP memory may be a type of digital memory implemented in circuitry or silicon of a device that may be programmed and cannot be changed after being programmed. For example, at a first time, the common key may be programmed into the OTP memory of a device and the common key may not be changed in the OTP memory after the programming of the common key into the OTP memory. Furthermore, at a second time, one or more device keys may be programmed into the OTP memory of the device and the device keys may not be changed in the OTP memory after the programming of the device keys into the OTP memory. Thus, the OTP memory may be considered a type of read only memory (ROM) after the programming of the common key and the one or more device keys into the OTP memory. In alternative embodiments, the common key and/or the device keys may be received in a device that does not include the OTP memory, and the common key and/or device keys may be stored in other types of memory of a device.

The key generator 200 may further receive a device identification (ID) 230 and a device key select 240. In some embodiments, the device key select 240 may be received from another portion of an integrated circuit that includes the key generator 200 or may be received as a signal from off-chip (e.g., the device key select 240 is received at an input buffer to the integrated circuit from another source such as another integrated circuit). Furthermore, the device ID 230 may be received from a memory location of the device (e.g., another portion of an integrated circuit that may include the key generator 200). In some embodiments, the device identification 230 may be a form of identification that is unique to a device. For example, the device identification may include, but is not limited to, a serial number of the device or any other information or number that may uniquely identify a specific device. Furthermore, the device key select 240 may be used to select a specific device key 210. For example, each device may be associated with multiple device keys. As an example, each device may be associated with eight device keys that are stored in OTP memory and the device key select 240 may be used to select one of the eight device keys that are stored in the OTP memory.

Referring to FIG. 2, the key generator 200 may further generate or create a primary key 250 based on the device key 210, the common key 220, the device identification 230, and the device key select 240. For example, a device key 210 that is selected based on the device key select 240 and a common key that is modified or diversified based on the device identification 230 and the device key select 240 may be used to generate or create the primary key 250. Thus, the device key select 240 may be used to determine the device key 210 as well as modify or diversify the common key 220 that is used to generate or create the primary key 250. Further details with regard to the generation or creation of the primary key 250 and the modification or diversification of the common key 220 are described in further detail below.

Figure 3:
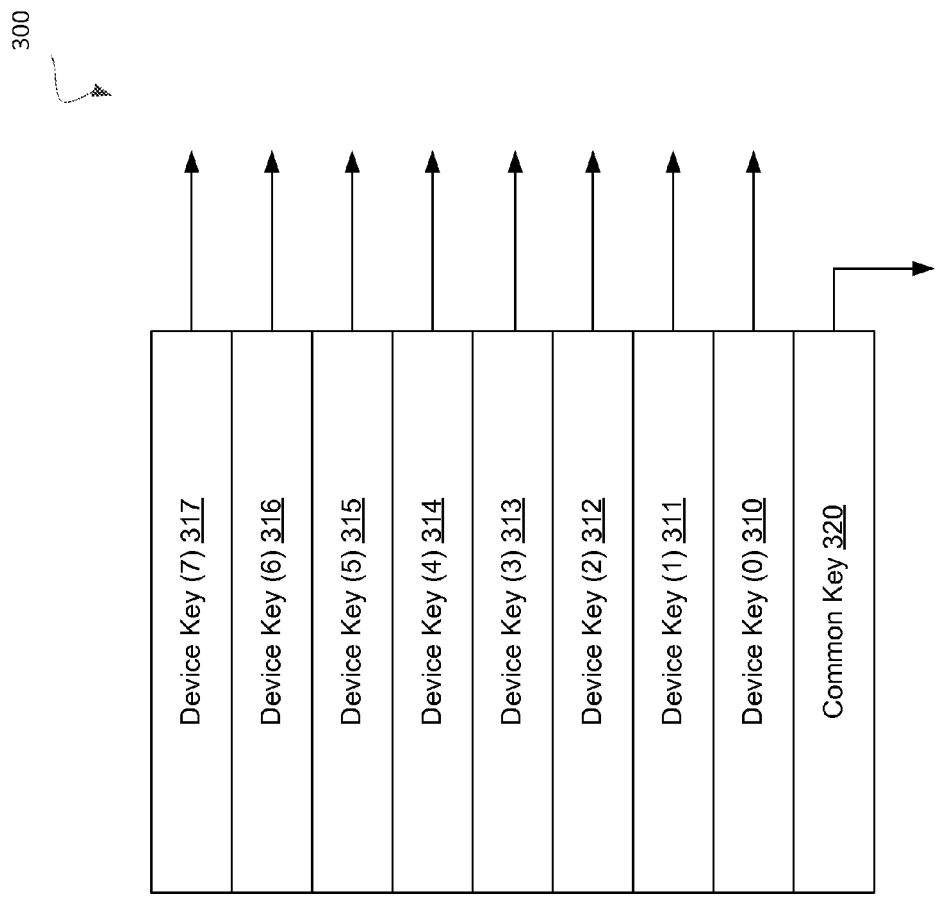
FIG. 3 is a block diagram of an example one-time programmable (OTP) memory in accordance with some embodiments.

FIG. 3 is a block diagram of an example one-time programmable (OTP) memory 300 in accordance with some embodiments. In general, the OTP memory 300 may store a common key 320 that may correspond to the common key 220 of FIG. 2 and device keys 310-317 that may correspond to device key 210 of FIG. 2. The OTP memory 300 may be part of a device that is used to generate a primary key (e.g., primary key 250).

As previously discussed, the OTP memory 300 may be a type of programmable read-only memory where the programming or setting of the common key 320 and the device keys 310-317 is permanent and cannot be changed after a programming of the common key 320 and the device keys 310-317.

The common key 320 and the device keys 310-317 may each be secret keys used in a cryptography process or algorithm to generate a third key (e.g., the primary key). Each of the common key 320 and the device keys 310-317 may be information or a parameter that determines the functional output of a cryptographic process or algorithm (e.g., the primary key). Thus, the common key 320 may be considered a first key of a pair of keys (i.e., a first key split) needed to generate the primary key and one of the device keys 310-317 may be considered a second key of the pair of keys (i.e., a second key split) that is needed to generate the primary key. In some embodiments, the primary key may be considered a working key that may be used by a device for authentication or performing authorized operations.

In some embodiments, the common key 320 may be associated with multiple devices. For example, the common key 320 may be stored in the OTP memory of a single type or class of devices. Thus, the OTP memory 300 of multiple devices of a same type or same class may include an identical common key 320 that is considered to be common to all devices of the type of device. In some embodiments, the device keys 310-317 may also be stored in the OTP memory of a device, but the device keys 310-317 may be different between devices so that the device keys 310-317 may be considered to be device dependent or unique to each device. Thus, as an example, a first device and a second device may be of a first type of device and a third device may be of a second type of device. The first device and the second device may be associated with a first common key and the third device may be associated with a second common key. The device keys for each of the first device, second device, and the third device may all be different or unique relative to the device keys of the other devices.

Although FIG. 3 illustrates the common key and the device keys being stored in OTP memory of a device, the common key and device keys may be stored elsewhere on a device. For example, the common key and the device key may be stored in alternative storage (e.g., ROM, RAM, NVM, FRAM, hard drive, flash, etc.) or memory locations of a device. Furthermore, although eight device keys 310-317 are illustrated, any number of device keys may be associated with a device. For example, in some embodiments, each device may only be associated with a single device key.

Figure 4:
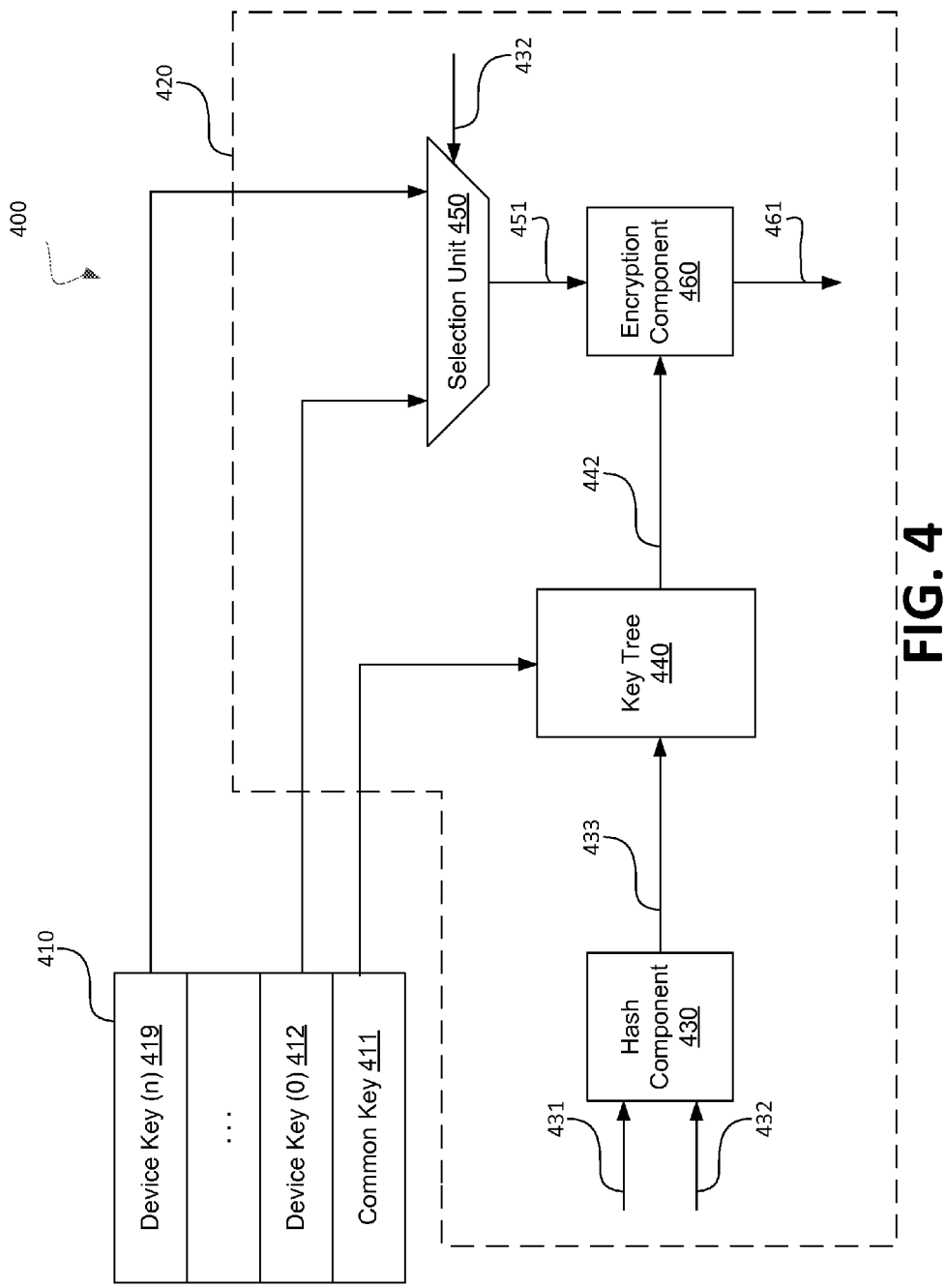
FIG. 4 is an example architecture of a key generator in accordance with some embodiments of the disclosure.

FIG. 4 is an architecture 400 of a device including a key generator 420. In general, the key generator 420 may correspond to the key generator 130 of FIG. 1 and the key generator 200 of FIG. 2. The key generator 420 may receive a device key (e.g., the second key 120, device key 210, and/or device keys 310-317) and a common key (e.g., first key 110, common key 220, and/or common key 320) and generate a primary key (e.g., primary key 140 and/or primary key 250) based on the device key and the common key. The architecture 400 may further include an OTP memory 410 that may correspond to the OTP memory 300 of FIG. 3.

As shown in FIG. 4, the architecture 400 may include an OTP memory 410 and a key generator 420. In some embodiments, the OTP memory 410 and the key generator 420 may be part of a device. For example, the OTP memory 410 and the key generator 420 may be implemented in circuitry of the device. Furthermore, the OTP memory 410 may store a common key 411 and one or more device keys 412-419 that may be used to generate or create a primary key 461.

As shown, the key generator 420 may receive a common key 411, device keys 412-419, a device identification 431, and a device key select signal 432. In some embodiments, one of the device keys 412-419 and a combination of the common key 411, device identification 431, and the device key select signal 432 may be used to generate or create the primary key 461. For example, as shown, the key generator 420 may include a hash algorithm component 430 in which inputs of the hash algorithm component 430 include the device identification 431 and the device key select signal 432. The hash algorithm component 430 may receive the inputs and perform a hash function that combines or maps the input data (e.g., the device identification 431 and the device key select signal 432) into a hash data signal 433 of a fixed length. In some embodiments, the hash algorithm component 430 may perform, but is not limited to, a cryptographic hash function such as a secure hash algorithm (SHA). Examples of an SHA include, but are not limited to, SHA-1, SHA-2, and SHA-3. Thus, the hash algorithm component 430 may receive the device identification 431 and the device key select signal 432 and generate a hash number or value that corresponds to the hash data signal 433. Although a hash algorithm component 430 is illustrated, in other embodiments, other operations may be used to generate the hash data signal 433. For example, an XOR logic operation and/or a truncation of the bits corresponding to the device identification 431 and the device key select signal 432 may be used to generate the hash data signal 433.

Referring to FIG. 4, the key generator 420 may include a key tree component 440. In some embodiments, the key tree component 440 may receive the hash data signal 433 and the common key 411 as inputs and may output a common key split 442 based on a function (e.g., a hash function) to combine the hash data signal 433 and the common key 411. In some embodiments, the key tree component 440 may include a key tree structure to protect the generation or creation of the common key split 442 by the key tree component 440 from external monitoring attacks such as differential power analysis (DPA) or other such unauthorized attacks that may attempt to gather information that is correlated to the internal operations of a device including the key generator 420. An example function of the key tree component 440 may include, but is not limited to, a cryptographic hash function. Thus, the use of the key tree component may be to diversify or modify the common key 411 with the hash data signal 433 that is based on the device identification 431 and/or the device key select signal 432. Further details with regard to the key tree component 440 are disclosed with regard to FIG. 8.

The key generator 420 may further include a selection unit such as a multiplexer 450. In some embodiments, the multiplexer 450 may receive and select one of the device keys 412-419 and forward the selected device key to an output line in response to the device key selection signal 432. For example, the device key selection signal 432 input of the multiplexer 450 may determine which of the device keys 412-419 may be forwarded as the output of the multiplexer 450. Thus, a value of the device key selection signal 432 may correspond to one of the device keys 412-419. In some embodiments, the output of the multiplexer 450 may be the device key split 451. Although a multiplexer 450 is shown as being part of the key generator 420, in some embodiments where a device or an OTP memory of a device includes a single device key as opposed to multiple device keys, the output of the OTP memory may not go through a selection unit 450 such as a multiplexer.

Referring to FIG. 4, the key generator 420 may include an advanced encryption standard (AES) component 460. In some embodiments, the AES component 460 may receive the common key split 442 and the device key split 451 and combine the common key split 442 and the device key split 451 to generate or create a primary key 461 as the output. In some embodiments, the AES component 460 may generate or create the primary key 461 based on encrypting the combination of the common key split 442 and the device key split 451. For example, the AES component 460 may receive 128 bits corresponding to the common key split 442 and an additional 128 bits corresponding to the device key split 461 and may generate or create the primary key 461 of 128 bits based on encrypting a combination of the common key split 442 and device key split 461. An example of an encryption mechanism includes, but is not limited to, the Advanced Encryption Standard (AES).

In some embodiments, the AES component 460 may be considered invertible. For example, as previously described, the AES component 460 may receive the common key split 442 and the device key split 451 and generate the primary key 461 based on the common key split 442 and the device key split 451. In some embodiments, the primary key 461 may be an input to the AES component 460 and one of the device key split that is derived from a device key or a common key split that is derived from a common key may be provided to the AES component 460 and the AES component 460 may provide or output either a common key (if a device key is provided) or a device key (if a common key is provided). Further details with regard to the invertible process performed by the AES component 460 are disclosed with regard to FIG. 9.

As such, the key generator 420 may receive a common key and a device key that is selected based on a device key selection signal. In some embodiments, the common key (i.e., first key) may be diversified or modified with a unique device identification and/or the device key selection signal to generate or create a modified common key (i.e., the common key split). The primary key may be generated based on a combination of the modified common key (i.e., the common key split) and the selected device key (i.e., the device key split).

Figure 5:
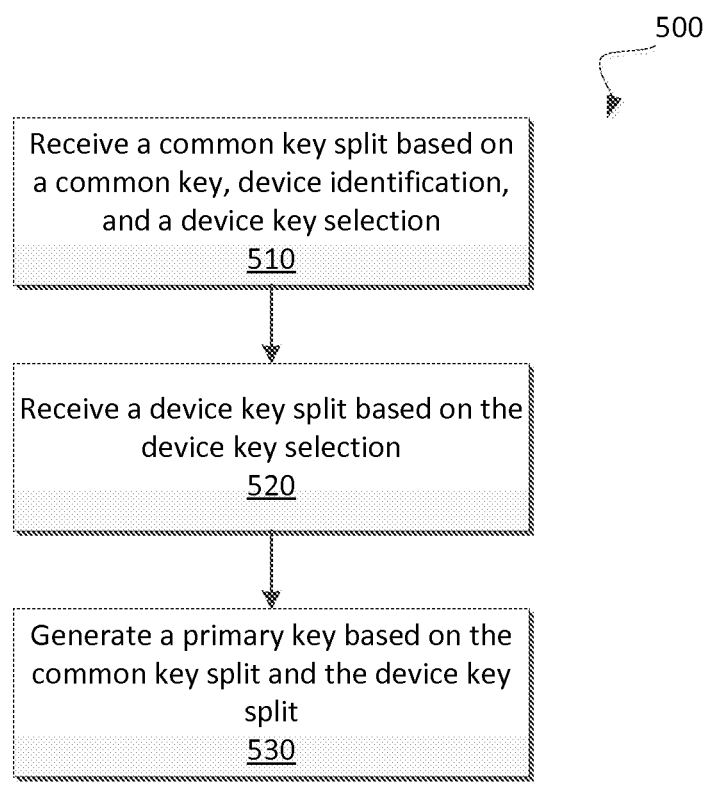
FIG. 5 is a flow diagram of an example method to generate a primary key in accordance with some embodiments.

FIG. 5 is a flow diagram of an example method 500 to generate a key. In general, the method 500 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 500 may be performed by the key generator 200 of FIG. 2 or the key generator 420 of FIG. 4.

As shown in FIG. 5, the method 500 may begin with the processing logic receiving a common key split based on a common key and a device identification (block 510). For example, an AES component (e.g., AES component 460) of the processing logic may receive the common key split. In some embodiments, if a device associated with the processing logic includes multiple devices keys (e.g., multiple devices keys stored in OTP memory or other memory location of the device) then the common key split may further be based on the device key selection. Further details with regard to the creation of the common key split are discussed with regard to FIG. 6.

The processing logic may further receive a device key split (block 520). For example, an AES component (e.g., the AES component 460) of the processing logic may receive the device key split. In some embodiments, if the device including the processing logic includes multiple device keys then the device key corresponding to the device key split that is received may be based on a device key selection signal. Such a selected device key may be referred to as the device key split. Further details with regard to the selection of the device key to be used as a device key split are discussed with regard to FIG. 7.

Returning to FIG. 5, the processing logic may further generate a primary key based on the common key split and the device key split. For example, the AES component of the processing logic may receive the common key split (e.g., common key split 442) and a device key split (e.g., device key split 451) and generate or create the primary key (e.g., primary key 461) based on a combination of the common key split and the device key split.

Figure 6:
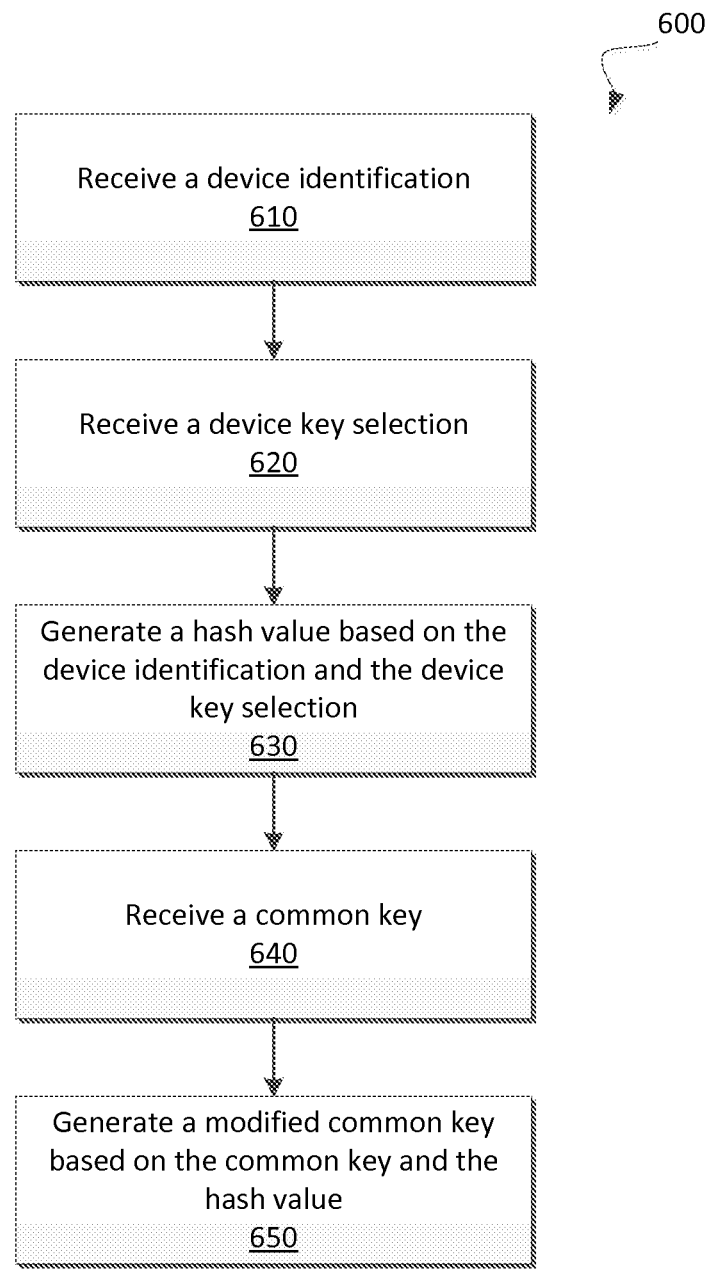
FIG. 6 is a flow diagram of an example method to generate a common key split based on a modified common key in accordance with some embodiments.

FIG. 6 is a flow diagram of an example method 600 to generate a common key split. In general, the method 600 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 600 may be performed by the key generator 200 of FIG. 2 or the key generator 420 of FIG. 4.

As shown in FIG. 6, the method 600 may begin with the processing logic receiving a device identification (block 610). For example, an SHA component (e.g., SHA component 430) of the processing logic may receive the device identification. In some embodiments, the device identification may be a unique identification number or text string (e.g., combination of numbers and/or letters) that is assigned to a single device. Furthermore, the processing logic may receive a device key selection signal (block 620). For example, the SHA component (e.g., SHA component 430) of the processing logic may receive the device key selection signal. The processing logic may generate a hash value based on the device identification and the device key selection (block 630). For example, the SHA component of the processing logic may generate or create the hash value (e.g., hash data signal 433). The processing logic may further receive a common key (block 640). For example, a common key (e.g., common key 411) may be received by a key tree component (e.g., key tree component 440) of the processing logic. Additionally, the processing logic may generate a common key split (i.e., the modified common key) based on the common key that has been received and the hash data signal that has been created based on the device identification and/or the device key selection signal. For example, the key tree component of the processing logic may generate or create the common key split or modified common key by performing a hash function on the common key and the hash value.

As such, the common key split (also referred to as the modified common key) may be created based on diversifying or modifying a common key with a device identification. Furthermore, in some embodiments with a device that is associated with multiple device keys, the common key split may be further based on the device key selection signal that is also used to select one of the device keys.

Figure 7:
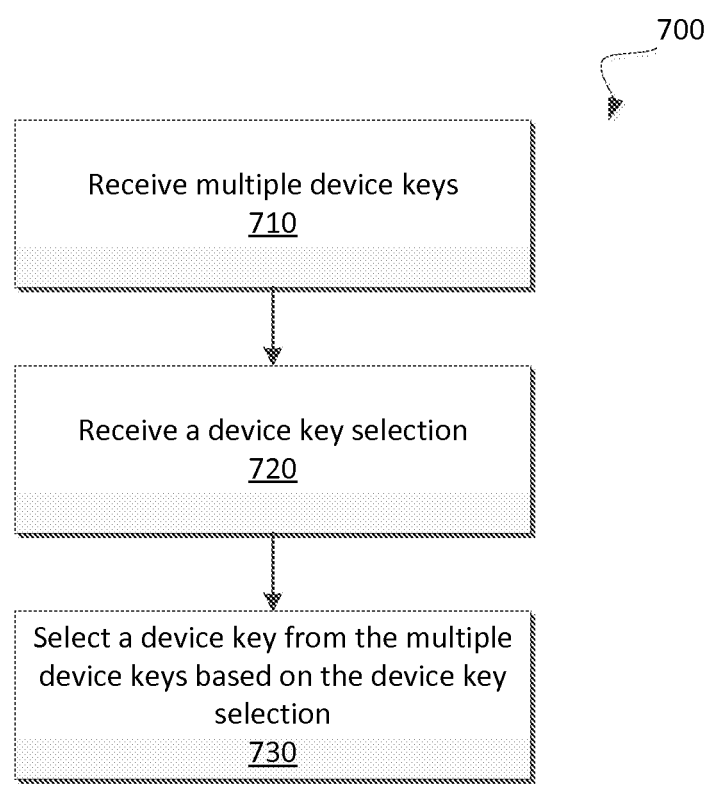
FIG. 7 is a flow diagram of an example method to select a device key to be used as a device key split in accordance with some embodiments.

FIG. 7 is a flow diagram of an example method 700 to select a device key. In general, the method 700 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 700 may be performed by the key generator 200 of FIG. 2 or the key generator 420 of FIG. 4.

As shown in FIG. 7, the method 700 may begin with the processing logic receiving multiple device keys (block 710). For example, a selection unit (e.g., the multiplexer 450) of the processing logic may receive multiple device keys or be coupled to a memory (e.g., OTP memory 410) storing multiple device keys. The processing logic may further receive a device key selection signal (block 720). For example, the selection unit of the processing logic may receive a device key selection signal corresponding to one of the device keys. Furthermore, the processing logic may select one of the device keys based on the device key selection signal (block 730).

Figure 8:
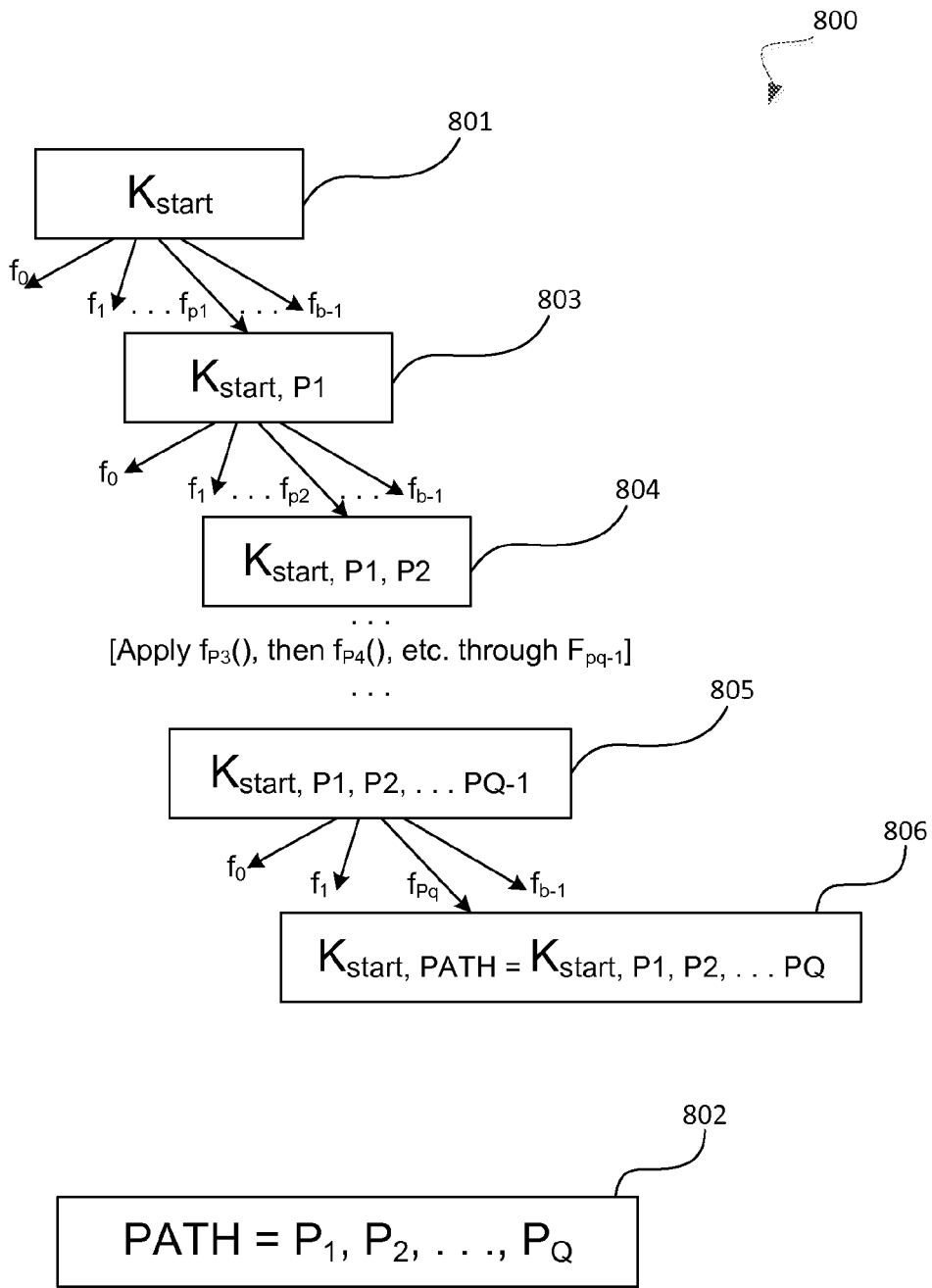
FIG. 8 is a block diagram of an example key tree in accordance with some embodiments of the present disclosure.

FIG. 8 is a block diagram of an example key tree 800 in accordance with some embodiments. In general, the key tree 800 may correspond to the key tree component 440 of FIG. 4. The key tree 800 may receive a first input (e.g., the hash data signal 433) that is based on a device identification and a second input (e.g., the common key 411) and produce a hash result that may correspond to a key (e.g., common key split 442) used to generate or create another key (e.g., the primary key 461).

In some embodiments, the key tree 800 may perform an entropy redistribution operation. As used herein, an "entropy redistribution operation" (or "entropy distribution operation") may be an operation that mixes its input(s) (e.g., the hash data signal 433 and the common key split 442) such that unknown information about input bits is redistributed among the output bits. For example, suppose an x bit cryptographic key $K_0$ is processed repeatedly with an entropy redistribution operation f such that key $K_i=f(K_{i-1})$ for each i>1. Next, suppose an adversary obtains y bits of information (e.g., obtained as part of an attempted external monitoring attack) about each of n different keys $K_i$, providing more than enough information to solve for key $K_0$ (e.g., y*n>x). The use of the entropy distribution operation f may make such solution computationally infeasible. A cryptographic hash function H is an example of an operation that may be used as an entropy redistribution operation. For example, consider a strong hash function H that produces a 256-bit result. Given a random 256-bit initial key $K_0$, let $K_i=H(K_{i-1})$ for each i>1. An adversary with knowledge of (for example) the least-significant bit of each $K_0 \ldots K_{999,999}$ has 1,000,000 bits of data related to $K_0$. A hypothetical adversary with infinite computing power could find $K_0$ by testing all possible $2^{256}$ values for $K_0$ to identify a value which is consistent with the known sequence of least-significant bits. Actual adversaries have finite computational power available, however, and the entropy redistribution operation prevents there from being a computationally practical way to solve for $K_0$ (or any other $K_i$) given the information leaked through attempted external monitoring attacks.

Entropy redistribution operations may be implemented, without limitation, using cryptographic hash functions, operations constructed using block ciphers (such as AES), pseudorandom transformations, pseudorandom permutations, other cryptographic operations, or combinations thereof. As a matter of convenience, certain exemplary embodiments are described with respect to a hash, but those skilled in the art will understand that, pursuant to the foregoing, other entropy redistribution functions may also be used instead or in addition.

Multiple entropy redistribution operations may also be constructed from a base operation. By way of example, if two 256-bit entropy redistribution operations $f_0( )$ and $f_i( )$ are required, $f_0( )$ could comprise applying the SHA-256 cryptographic hash function to the operation identifier string "f0" concatenated with the input to $f_0( )$ while $f_1( )$ could comprise applying SHA-256 to the operation identifier string "f1" concatenated with the input to $f_1( )$. Entropy redistribution operations can be construed using the well-known AES block cipher. For example, to implement $f_0( ) \ldots f_{b-1}( )$ each $f_i( )$ can use its input as an AES-256 key to encrypt a pair of 128-bit input blocks that are unique to the choice of i within $0 \ldots b-1$, yielding 256 bits of output.

The key tree 800 may be able to compute a set of non-linear cryptographic entropy redistribution operations $f_0( ), f_1( ), \ldots f_{b-1}( )$, where b>1 is a positive integer. These b entropy redistribution functions can be configured in a tree structure. For example, a simple b-ary tree structure of height Q (i.e., having Q+1 levels, from 0 through Q) can be created by using b distinct entropy distribution functions, $f_0( ) \ldots f_{b-1}( )$, to represent the b possible branches of this b-ary tree at each node of the tree, each node representing a possible derived key. In such a tree, starting from a root cryptographic key $K_{START}$ (which is at level 0), b possible derived keys can be computed at level 1: $f_0(K_{START})$ for the leftmost branch; $f_1(K_{START})$ for the next branch; and continuing until $f_{b-1}(K_{START})$ for the rightmost branch. At level 2, $b^2$ possible keys can be derived, since each of $f_0( ) \ldots f_{b-1}( )$ could be applied to each of the b possible level 1 keys. Of course, computing a specific level 2 node only requires two, not $b^2$, computations (i.e., the nodes not on the path are not computed). The tree continues for successive levels 1 through Q, where each possible key (i.e., a different node) of a prior level can be processed by applying $f_0( ) \ldots f_{b-1}( )$ in turn to derive b additional possible derived keys. The entire key tree has Q+1 levels, starting with a single node at level 0, continuing with $b^i$ nodes at level i, and ending with $b^Q$ nodes at level Q. Thus, there are $b^Q$ possible paths from the root node at level 0 to the $b^Q$ final nodes at level Q. Each such possible path, corresponding to a unique the sequence of functions applied at the different levels, can be represented as a sequence of Q integers, each integer being selected from $(0 \ldots b-1)$. For example, in an exemplary embodiment, b=2. Thus, two entropy redistribution operations, $f_0( )$ and $f_1( )$ are used (and may be constructed from a base operation, e.g., as described above). If Q=128 (i.e., the height is 128), $2^{128}$ paths are possible and 128 entropy redistribution function computations are required to derive the level Q key from the level 0 node (i.e., the starting key).

As a variation, embodiments may involve more variety in the choice of b, such as varying the value of b among levels, and/or varying b based on the route taken to a particular level. Likewise, the entropy redistribution operations can also be varied, such as by making the entropy redistribution operations $f_i( )$ differ at different levels or making these operations depend on the sequence taken to a particular level.

An example key derivation process is diagrammed in FIG. 8. The process begins with a starting point of the tree, which is denoted $K_{START}$ (801), and a path $P_1 \ldots P_Q$ (802). For example, $K_{START}$ is the value of common key 411 and path $P_1 \ldots P_Q$ (802) is determined by hash data signal 433. (The conversion of hash data signal 433 into $P_1 \ldots P_Q$ is discussed below.) The path specifies a succession of entropy redistribution operations to be applied to $K_{START}$.

In an implementation, message identifier $H_1$ is decomposed into Q parts $P_1, P_2, \ldots P_Q$. In an example decomposition, each part $P_i$ is an integer from 0 thru (b−1) (e.g., if b=4 then each $P_i$ is a two-bit value (0, 1, 2, or 3)). Likewise, if b=2, each $P_i$ is a single bit (0 or 1). Hence, the path parts $P_1 \ldots P_Q$ can be used to specify a specific path from $K_{START}$ to $K_{START,PATH}$ by applying functions $f_0( ), f_1( ) \ldots, f_{b-1}( )$ to produce a plurality of intermediate keys leading to $K_{START,PATH}$ as follows. First, the function $f_{P\,1}$ is applied to $K_{START}$ (803) to yield an intermediate key $K_{START,P\,1}$, followed by the application of $f_{P\,2}$ on $K_{START,P\,1}$ to yield the intermediate key $K_{START,P\,1,P\,2}$ (804) and so on, until the final application of $f_{P\,Q}$ on the intermediate key $K_{START,P\,1,P\,2,\ldots,P\,Q-1}$ (805) to yield the final derived key, $K_{START,P\,1,P\,2,\ldots,P\,Q}$ (806). Note that the derivation of each intermediate key depends on at least one predecessor key and the relevant portion of the message identifier. For convenience, this final derived key may be denoted with the notation $K_{START,PATH}$ (indicating the key that was reached by starting with $K_{START}$ and following PATH).

Figure 9:
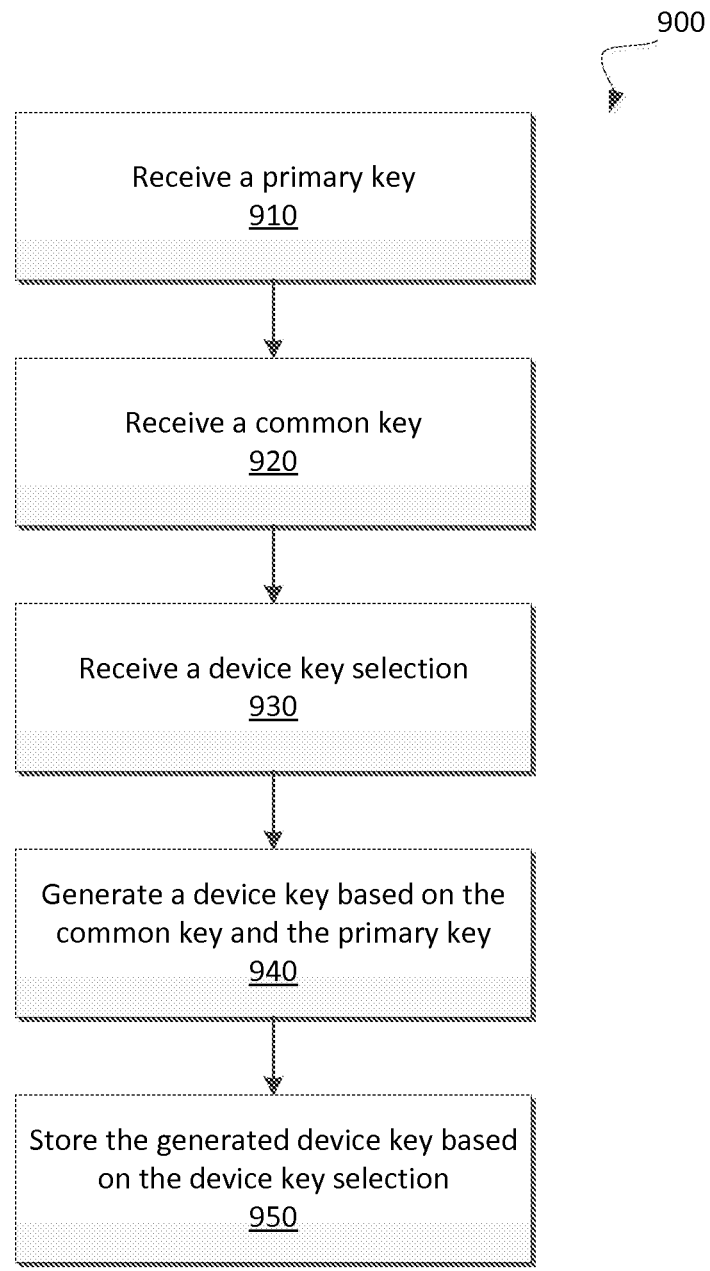
FIG. 9 is a flow diagram of an example method to generate and store a device key using a key generator in accordance with some embodiments.

FIG. 9 illustrates an example method 900 to determine a device key in accordance with some embodiments. In general, the method 900 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 900 may be performed by the key generator 200 of FIG. 2 or the key generator 420 of FIG. 4.

As shown in FIG. 9, the method 900 may receive a primary key (block 910). For example, an AES component (e.g., AES component 460) may receive a primary key (e.g., primary key 461). In some embodiments, the AES component may be invertible so that a primary key may be generated by the AES component based on a common key and a device key or a device key may be generated based on the common key and the primary key. Furthermore, the processing logic may receive a common key (block 920). For example, the invertible AES component may further be supplied a common key (e.g., common key 411). The processing logic may receive a device key selection (block 930) and may generate a device key based on the primary key and the common key (block 930). In some embodiments, the device key may be further generated based on the device key selection signal. Furthermore, the processing logic may store the generated device key (block 950). For example, the generated device key may be stored in a particular location of a memory (e.g., OTP memory 410) based on the device key selection.

Figure 10:
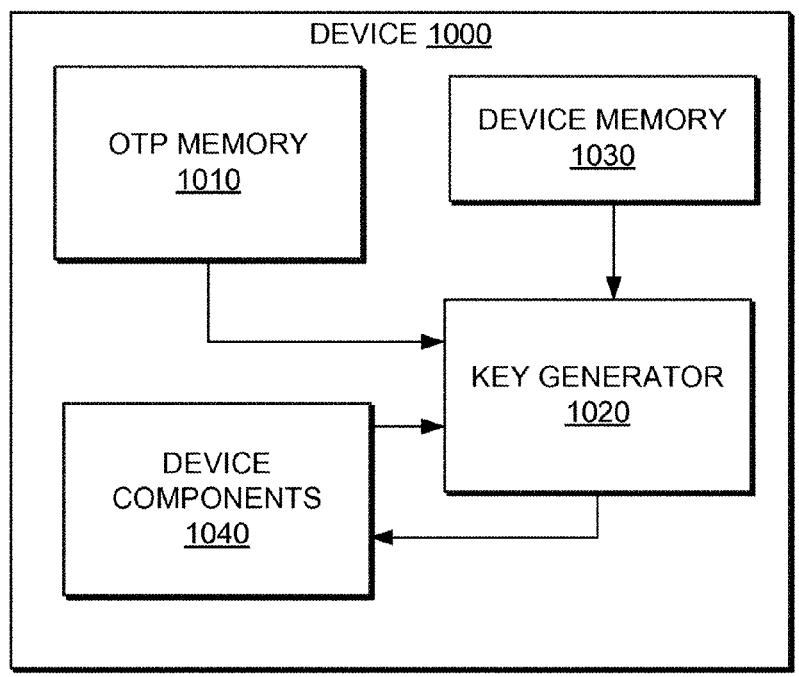
FIG. 10 is a block diagram of an example device including a key generator in accordance with some embodiments.

FIG. 10 is a block diagram of an example device 1000 including a key generator. In general, the example device may include an OTP memory 1010 that may correspond to OTP memory 300 of FIG. 3 and a key generator 1020 that may correspond to key generator 130 of FIG. 1, key generator 200 of FIG. 2, or key generator 420 of FIG. 4.

Examples of the device 1000 may include, but are not limited to, a System on a Chip (SoC), field programmable gate array (FPGA), and a processor that may include an integrated circuit. As shown, the integrated circuit of a device 1000 may include an OTP memory 1010, a key generator 1020, device memory 1030, and device components or architecture 1040. In some embodiments, the OTP memory 1010 may be a type of programmable read-only memory that may store a common key and one or more device keys. The integrated circuit of the device 1000 may further include a device memory 1030 which may be a type of random access memory, read-only memory, or other such memory storage. In some embodiments, the memory 1030 may store a device identification. Additionally, the integrated circuit of the device 1000 may include a key generator 1020, as previously described. In some embodiments, the integrated circuit of the device 1000 may further include device components or architecture 1040. The device components or architecture 1040 may include a central processing unit (CPU) or other type of processing device, memory, or other such circuit components. In some embodiments, the device components or architecture 1040 may further include functionality to provide the common key of the device 1000. As an example, a processing unit of the device components 1040 may use a primary key that is generated by the key generator 1020. In some embodiments, the processing unit of the device components 1040 may initiate a request for the generation of the primary key by the key generator 1020. In response, the key generator 1020 may retrieve the common key (e.g., from the OTP memory 1010 or from the device components 1040) and may further retrieve a device key from the OTP memory 1010 and receive a device identification from the device memory 1030 and a device key selection signal from the device components 1040.

Figure 11:
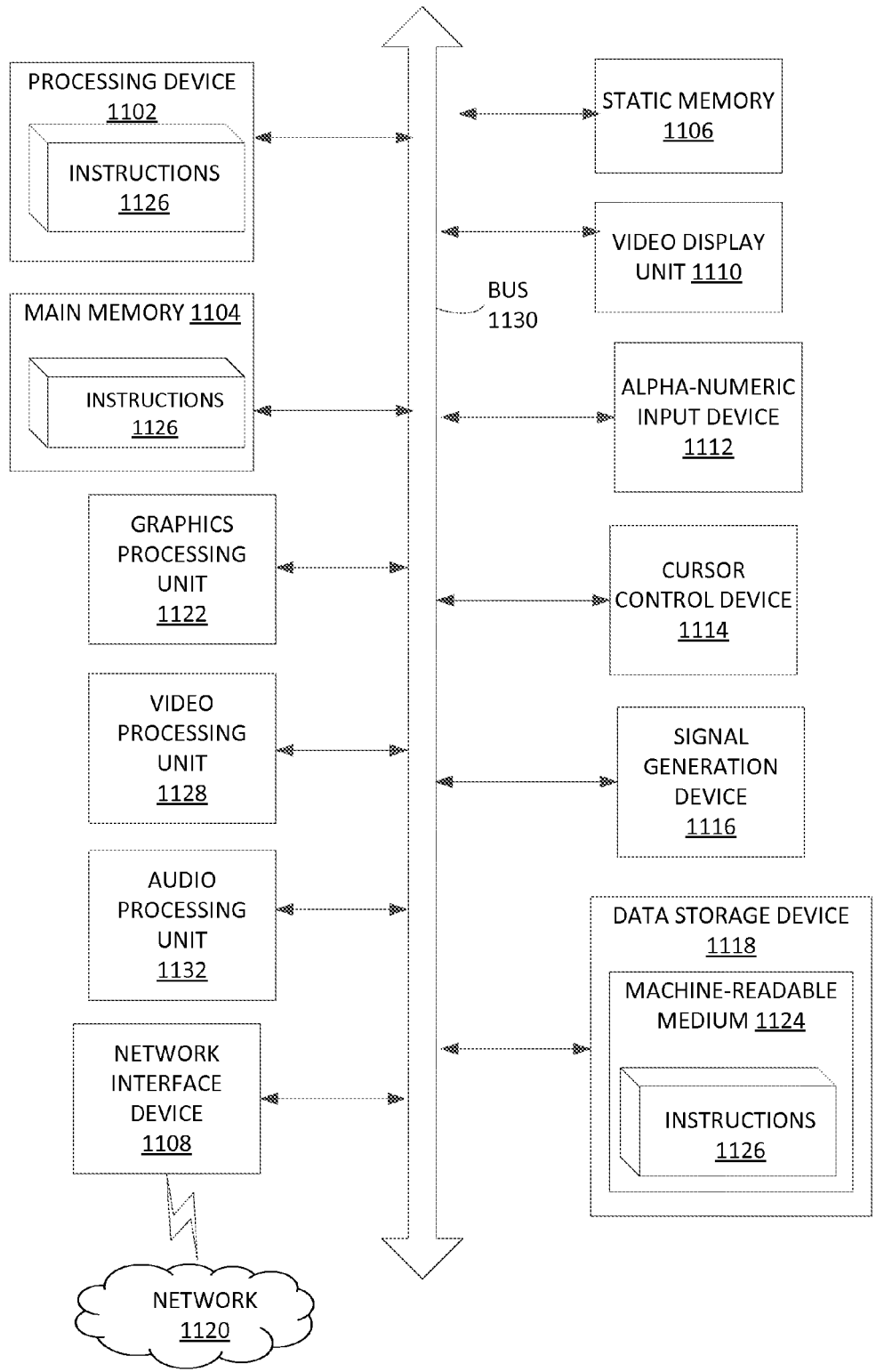
FIG. 11 illustrates a block diagram of an embodiment of a computer system in which some embodiments of the disclosure may operate.

FIG. 11 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet via a network 1120. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device 1102, a main memory 1104 (e.g., read-only memory (ROM), flash memory, dynamic random access memory (DRAM) such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein.

The computer system may further include a network interface device 1108. The computer system also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, a video processing unit 1128, an audio processing unit 1132, and a signal generation device 1116 (e.g., a speaker).

The data storage device 1118 may include a machine-readable storage medium 1124 (also known as a computer-readable medium) on which is stored one or more sets of instructions or software 1126 embodying any one or more of the methodologies or functions described herein. The instructions 1126 may also reside, completely or at least partially, within the main memory 1104 and/or within the processing device 1102 during execution thereof by the computer system, the main memory 1104 and the processing device 1102 also constituting machine-readable storage media.

In one implementation, the instructions 1126 include instructions to implement functionality corresponding to a key generator (e.g., key generator 200 of FIG. 2 or key generator 420 of FIG. 4). While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving, by a processing device, a first key associated with a plurality of devices;
receiving, by the processing device, a second key associated with a single device of the plurality of devices;
modifying, by the processing device, the first key associated with the plurality of devices based on a device identification of the single device; and
generating, by the processing device, a primary key based on the modified first key and the second key.

2. The method of claim 1, further comprising:
receiving a selection signal corresponding to the second key, wherein the second key is selected from a plurality of second keys associated with the single device based on the selection signal corresponding to the second key.

3. The method of claim 2, wherein the modifying of the first key associated with the plurality of devices is further based on the selection signal corresponding to the second key.

4. The method of claim 3, further comprising:
generating a first hash value based on the device identification and the selection signal corresponding to the second key,
wherein the modifying of the first key based on the device identification comprises generating a second hash value based on the first hash value and the first key.

5. The method of claim 4, wherein the generating of the primary key based on the modified first key and the second key includes encrypting a combination of the second hash value and the second key.

6. The method of claim 1, wherein the generating of the primary key is further based on an encryption using the modified first key and the second key associated with the single device.

7. The method of claim 1, wherein the modifying of the first key associated with the plurality of devices based on the device identification of the single device is performed by a cryptographic hash component, wherein the cryptographic hash component performs a hash function on the modified first key and the device identification to provide protection from differential power analysis (DPA).

8. A system comprising:
a memory to store a common key and one or more device keys; and
a processor, operatively coupled with the memory, to:
receive the common key from the memory;
receive one of the device keys from the memory;
receive a device identification;
modify the common key based on the device identification; and
generate a primary key based on the modified common key and the received device key.

9. The system of claim 8, wherein the processor is further to:
receive a signal corresponding to one of the device keys, wherein the received device key is selected from the device keys based on the signal corresponding to one of the device keys.

10. The system of claim 9, wherein the modifying of the common key is further based on the signal corresponding to one of the device keys.

11. The system of claim 8, wherein the processor is further to:
generate a first hash value based on the device identification and a signal corresponding to one of the device keys,
wherein the modifying of the common key based on the device identification comprises generating a second hash value based on the first hash value and the common key.

12. The system of claim 11, wherein the generating of the primary key is based on an encryption using the second hash value and the received device key.

13. The system of claim 8, wherein the generating of the primary key based on the modified common key and the received device key comprises encrypting the modified common key and the received device key.

14. The system of claim 8, wherein the common key is assigned to a plurality of devices and the device keys are assigned to a single device.

15. An apparatus comprising:
a key tree component to generate a first key split based on a common key and a first value corresponding to a device identification;
a selection unit to select a device key and to output the device key as a second key split; and
an encryption component to generate a primary key based on an encryption using the first key split and the second key split.

16. The apparatus of claim 15, wherein the selection unit is further to receive a device key selection signal, and wherein the device key is selected from a plurality of device keys based on the device key selection signal, and wherein the first value is further based on the device key selection signal.

17. The apparatus of claim 16, further comprising:
a hash component to generate the first value by performing a hash function based on the device identification and the device key selection signal.

18. The apparatus of claim 15, wherein the key tree component performs an entropy redistribution operation based on the common key and the first value, wherein the entropy redistribution operation provides protection from differential power analysis (DPA).

19. The apparatus of claim 15, wherein the encryption component performs an Advanced Encryption Standard (AES) encryption using a combination of the first key split and the second key split.

20. The apparatus of claim 15, wherein the common key is assigned to a plurality of devices and the device keys are assigned to a single device.

* * * * *